T. L. DORROS.
MECHANICAL MOVEMENT.
APPLICATION FILED JUNE 20, 1912.
1,100,546.
Patented June 16, 1914.
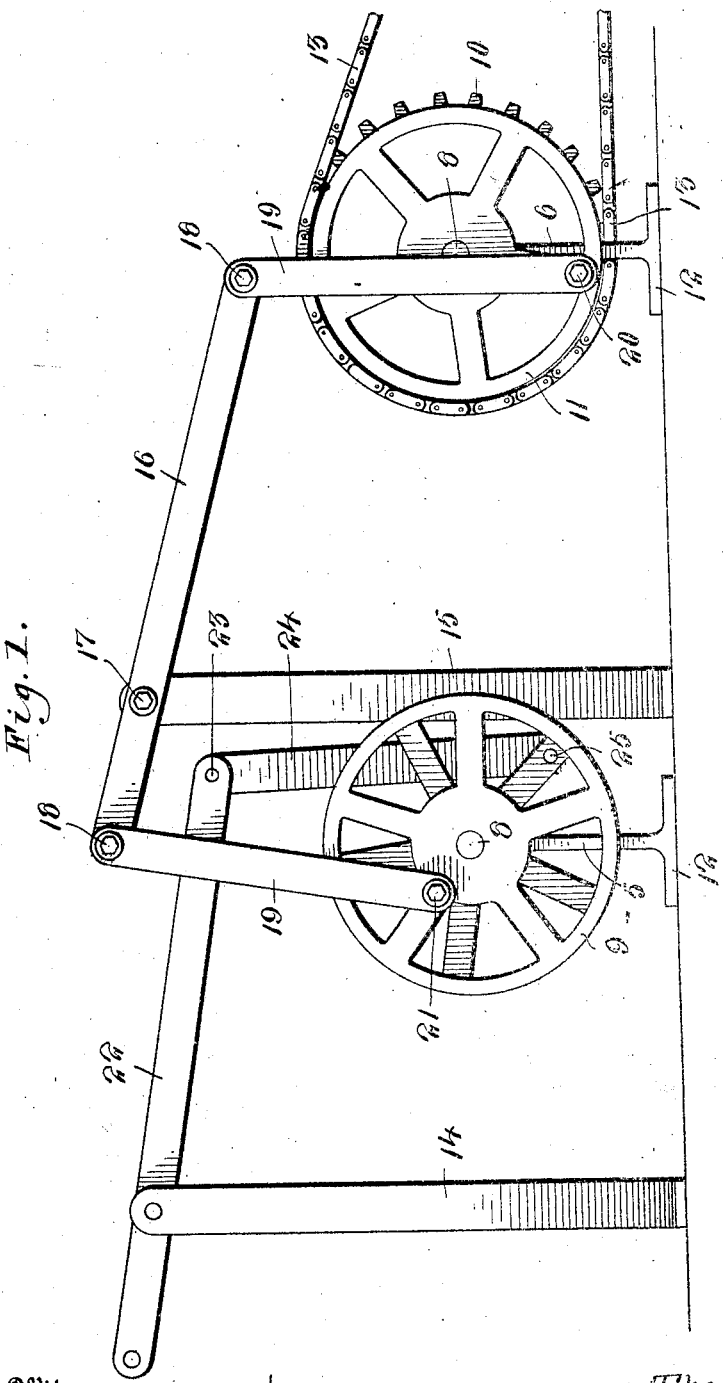
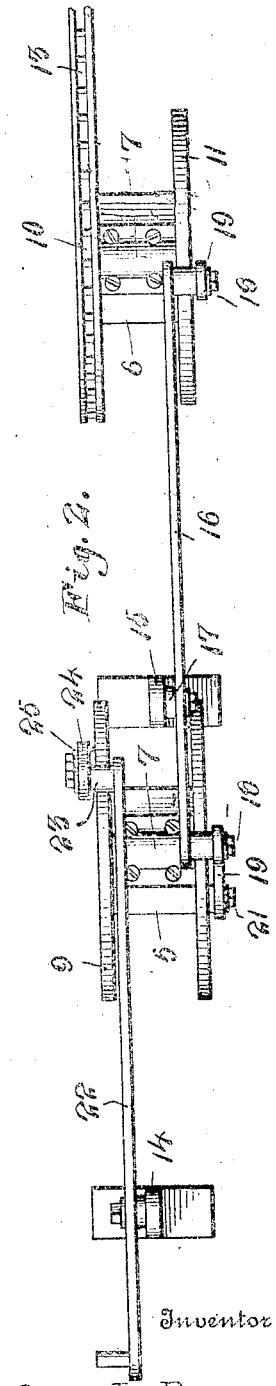
Witnesses
E. R. Ruppert
L. O. Parker
Inventor
Theodore L. Dorros
By Victor J. Evans
Attorney

UNITED STATES PATENT OFFICE.

THEODORE L. DORROS, OF WASHINGTON, DISTRICT OF COLUMBIA.

MECHANICAL MOVEMENT.

1,100,546.  Specification of Letters Patent.  Patented June 16, 1914.

Application filed June 20, 1912. Serial No. 704,832.

*To all whom it may concern:*

Be it known that I, THEODORE L. DORROS, a citizen of the United States, residing at Washington, in the District of Columbia, have invented new and useful Improvements in Mechanical Movements, of which the following is a specification.

The invention relates to mechanical movements, and more particularly to the class of power multiplying apparatus.

The primary object of the invention is the provision of an apparatus of this character in which power from any suitable engine or motor may be increased for the running of machinery or other mechanism without requiring the racing of the engine or motor or otherwise increasing the speed of the said engine or motor.

Another object of the invention is the provision of an apparatus of this character which is simple in construction, possessing few parts, thoroughly reliable and efficient in its operation, and inexpensive in manufacture.

With these and other objects in view the invention consists in the construction, combination and arrangement of parts as will be hereinafter more fully described, illustrated in the accompanying drawings, and pointed out in the claim hereunto appended.

In the drawings: Figure 1 is a side elevation of a power multiplying apparatus constructed in accordance with the invention. Fig. 2 is a top plan view thereof.

Similar reference characters indicate corresponding parts throughout the several views in the drawings.

Referring to the drawings by numerals, the power multiplying apparatus comprises a pair of standards 5 and 6 respectively, the same being suitably spaced apart and are formed at their front ends with separable bearings 7, in which are journaled horizontally disposed spindles or stud shafts 8, on one of which is mounted at its opposite ends a pair of fly wheels 9, the same being designed to work in unison, while fixed to the other spindle at one end thereof is a driven sprocket wheel 10, although a belt wheel may be substituted therefor, and fixed to its opposite end is a fly wheel 11, the standards 5 and 6 being provided with bases 12 which are suitably fixed to any desirable foundation or stationary support.

Trained over the sprocket wheel 10 is a driven sprocket chain 13, which is acted upon through the medium of an engine or motor so as to impart rotation to the spindle 8 supporting the sprocket and fly wheels 10 and 11, which motion is designed to be transferred to the spindle 8 carrying the fly wheels 9 in a manner presently described.

Arranged on opposite sides of the standard 5 and fixed to the foundation or stationary support are vertical posts 14 and 15 respectively, the latter post supporting a lever 16 pivoted at 17 thereto, and this lever has pivoted at 18 to its opposite ends depending links 19, one of which is pivoted eccentrically at 20 to the fly-wheel 11, while the other link 19 is pivoted eccentrically at 21 to the fly wheel 9, which is arranged in alinement with the fly wheel 11, so that on the rotation of said fly wheel 11 similar movement will be imparted to the fly wheel 9, for the rotary reciprocation of the spindle 8 supporting the same.

Supported upon the post 14 is a lever 22, to one end of which is pivoted at 23 a depending link 24, the same being pivoted eccentrically at 25 to the other fly wheel 9, and the outer remaining end of the lever 22, is adapted to be connected with a throw rod or other connection with a motor or the like, whereby the same may be driven through the medium of the connections hereinbefore described without necessitating the racing or the increasing of the speed of the engine or motor driving the same.

In connection with fly wheels 9 it will be noted that while said wheels are connected for similar and simultaneous movement, the respective bar levers are through their links connected at diametrically opposite points to said fly wheels, thereby taking advantage of the balanced action.

From the foregoing description, taken in connection with the accompanying drawings, it is thought that the construction and operation of the invention will be clearly understood, and therefore, a more extended explanation has been omitted.

What is claimed is:—

In combination, spaced apart vertical standards, horizontal shafts mounted in said standards, a relatively large sprocket wheel fixed upon one of said shafts, a transmission wheel fixed upon said other shaft, means for rotating said sprocket wheel, a post disposed substantially alongside of said transmission wheel, a second post spaced in advance of said transmission wheel, a wrist pin carried peripherally and at right angles by said sprocket wheel, a wrist pin carried by said transmission wheel contiguous to its periphery, a second wrist pin carried by said transmission wheel proximate to the shaft upon which said wheel is mounted, a link of a length greater than the diameter of said sprocket wheel pivotally connected to the wrist pin carried by the latter, a lever fulcrumed eccentrically upon said first named post and having its major portion pivotally connected to the free end of said link, a second link equal in length to the first named link pivotally connected at one end to the free end of said lever and at its opposite end to said third mentioned wrist pin, a third link equal in length to either of said first named links being pivoted to said remaining wrist pins, and a lever fulcrumed eccentrically upon said remaining post and having its major portion pivotally connected to the free end of said third mentioned link.

In testimony whereof I affix my signature in presence of two witnesses.

THEODORE L. DORROS.

Witnesses:
K. ALLEN,
BENNETT S. JONES.